3,522,380

CIRCUIT ARRANGEMENT FOR AN EXCHANGE SYSTEM OPERATING ACCORDING TO THE TIME MULTIPLEX PRINCIPLE

Otto Kneisel, Herbstrasse 18, Gauting b; Albert Fisch, Bushingstrasse 65; and Horst Honold, Cimbernstrasse 66, all of Munich, Germany Filed Sept. 16, 1966, Ser. No. 580,034
Claims priority, application Germany, Sept. 28, 1965, S 99,734
Int. Cl. H04j 3/00
U.S. Cl. 179—15 7 Claims

ABSTRACT OF THE DISCLOSURE

A time multiplex telephone exchange system in which a central control system performs the necessary connection processes asynchronously with respect to the pulse phases in which connection stations are connected to the multiplex line.

GENERAL DESCRIPTION

Figure 1:
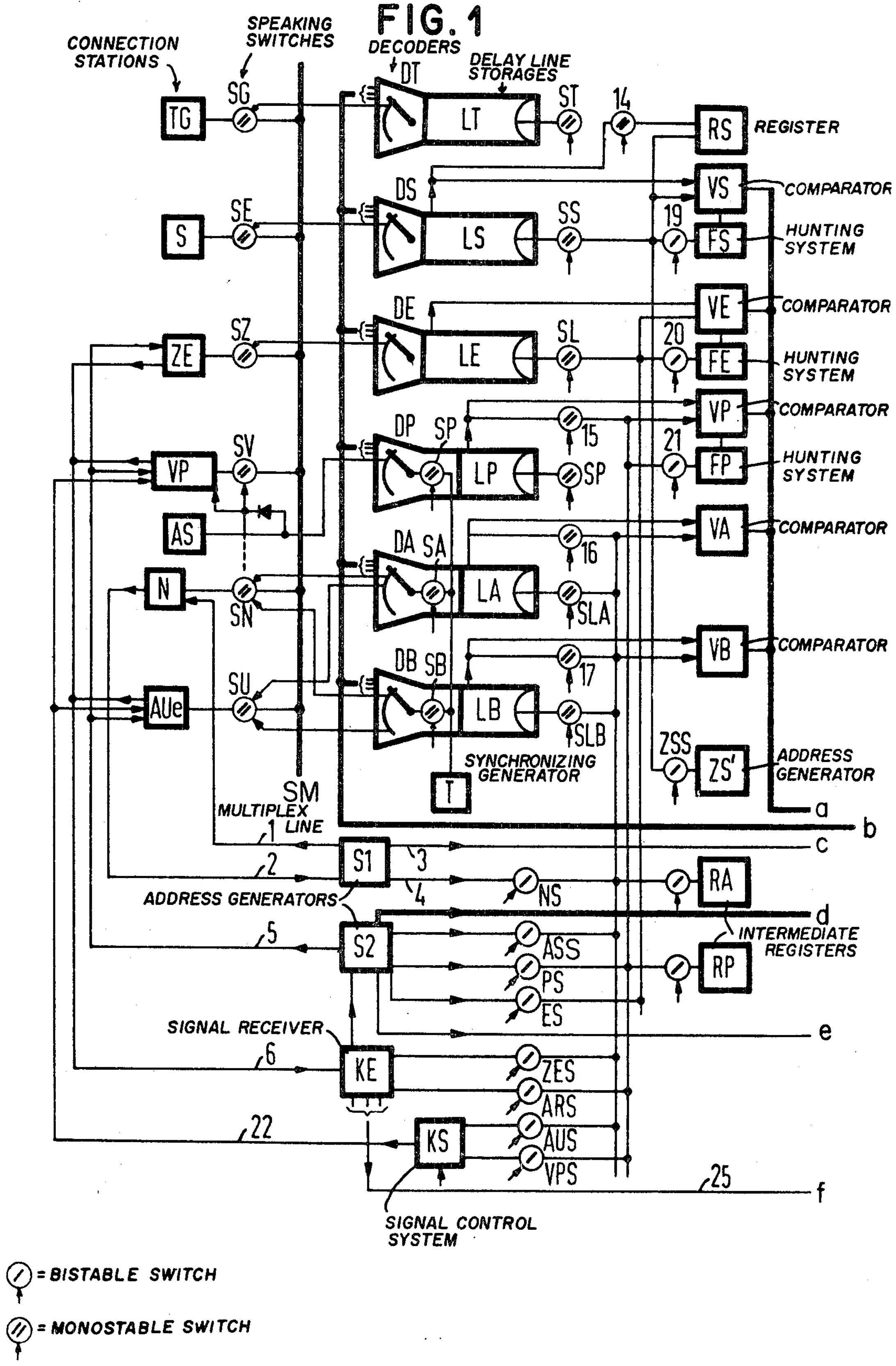

This invention relates to a telephone exchange system and more particularly to such a system operating on a time multiplex principle. In the system of the invention, multiplexing is effected in accordance with a predetermined pulse phase rate wherein a given phase is assigned to a calling connection station. In the following, the term connection station includes any of various types of systems such as subscriber stations, exchange places, repeaters, registers, and the like. The assigned pulse phase identifies the appropriate connection stations, and enables a determination of priority for effecting completion of circuit processes relating to the reception or transmission of information, such as information codes or other signals, and the establishment and completion of connections through the system, such as for establishing communication circuits for completing demanded call connections in accordance with time multiplex operations.

The system of the invention provides for the multiplex operation, based on the pulse phase assignments, while in addition providing further control capabilities independent of the phase cycle. The operation, independent of the phase cycle, is termed asynchronous, since the operation of the central control system of the installation is not controlled by the phase cycle, but rather responds to static information presented to it. The central control system processes information transmitted thereto from any of the various connection stations associated with the installation. The operation of the central control system is independent from the phase cycle, or the specific phase assigned to the given connection stations, whereas information is received from these connection stations in accordance with the assigned phase.

The asynchronous operation is effected through the provision of various control systems assigned to the central control system. As a first control system there is provided a demand regulator which ascertains the succession of connection demands presented by the different connection stations, which demands must be processed by the central system, and identifies the demanding connection station or system in response to a suitable code. A phase finder is connected to the demand regulator and ascertains the pulse phase of signals present at the occurrence of a demand by a connection station. The phase finder controls the transmission of information, i.e., that information relating to a given, assigned phase, to special registers associated with the central control system. The information is presented statically (that is, independently of the pulse phase cycle, as by operation of bistable switches) to the central system, and indicates the current condition of a demand or a connection, whereby the central system produces appropriate command signals to control further circuit operations, in accordance with the demand. The processing of these information signals by the central control system is thus independent of the pulse phase assigned thereto. The phase finder, however, is further connected with a travel time register, which may comprise a delay line register, which registers the pulse phase of the information signals supplied to the central control system and maintains such registration for the time period required by the latter to process the now statically registered information signals into control commands.

The asynchronous operation is only possible, of course, due to the capability of providing static input information signals to the central control system. Ultimately, of course, there must be a registration of the phase assigned to the stations producing the information signals, as this registration is provided by the travel time register, as described. However, since the central control system operates on an asynchronous basis, the information signals received thereby may be processed into commands which may further be conveyed as information signals to a second system. Such second and subsequent systems may, in turn, process the received information signals into suitable further commands.

The asynchronous operation achieved by the telephone exchange installation of the invention contributes to great efficiency and higher speed in satisfying connection demands. The systems required for processing the statically registered information signals, or the static commands produced by a central control system in response thereto, are demanded only when the necessary information for a connection establishment is present and prepared for processing. Thus, the central control system and its related systems are not occupied with time delays during accumulation of the information but are only demanded and only operate in response to a demand representing the complete information required for a connection establishment. Thus, the entire operation period of the central control system is considerably shortened and it can carry out additional, special functions.

A further, significant advantage of the installation of the invention is derived from the asynchronous operation enabled by the use of static input information signals independent of the phase cycle. In the installation of the invention, an address generator is employed which produces the demand to the central control system and identifies the address of the demanding connection station in accordance with the assigned pulse phase. The central control system however processes this information, although collected in accordance with an assigned phase, independently of the specific phase of any given input information signals. Thus, where changes, such as enlargement of the load handling capability, of the telephone installation are required, in the absence of any modification of the programming for information processing by the central control system and its related systems, these central and related systems need not be modified. The installation of the invention, therefore, provides both a more highly efficient system providing improved operation in an established installation, but also a greater flexibility for modification of its load handling and other capabilities, at a minimum of cost and without any substantial disruption of the system operation.

STATE OF THE PRIOR ART

It is known to operate telephone exchange systems on a time multiplex principle. Such systems may be operated either by assigning pulse phases individually to connection stations, including subscriber stations, secondary installation exchanges, and the like, or to assign the pulse phases individually to established connections.

In the latter type of installation, a speaking switch is assigned to each connection station participating in a call connection for completing the circuit to the communication multiplex line. A connection between a calling connection station and a called connection station is established over a communication multiplex line by means of a switch actuated by the pulse phase assigned to the connection.

Delay line storages are provided for calling and called connection stations in which the addresses thereof are registered in accordance with the pulse phases assigned to the call connection. A decoder associated with each delay line register responds to the output thereof to actuate the communication switch at the appropriate pulse phase to establish the connection path. Special delay line storages with associated decoders are provided for the reception and registration of identification digit information and for the connection of signals to, or from, the communication or signal multiplex lines. The processing of the information identifying the connection stations and the requisite call connections, and the information, such as that presented by the delay line storages over comparators, takes place in a central control system.

There are also known time multiplex systems in which a phase is assigned to each connection station participating in a connection. Since stations participating in the connection may then have different assigned phases, generally a circuit phase is assigned to each different connection. Delay line registers and a central control system, as described above, are also provided for the registration and processing of information related to call connections.

The prior art also teaches telephone exchange systems operating according to the time multiplex principle, wherein the information supplied to the central control system can be processed according to phase. In accordance with the foregoing, this phase may be that assigned to the connection or the circuit phase in a system in which phases are assigned to the connection stations. In such systems, the timing or sequence of events relating to control processes in the central control system is dependent on and controlled by the phase cycle.

OBJECTS OF THE INVENTION

Prior art telephone exchange installations operating on the time multiplex principle, as described above, are not entirely satisfactory. Due to the synchronous operation required by the phase cycle timing of the central control system, the system operation is inflexible and cannot adjust to actual load conditions or demands presented. Further, the phase cycle synchronization of the central control system seriously restricts modification of the installation, such as may be required due to increased load demands.

It is therefore an object of this invention to provide an improved telephone exchange system operating according to the time multiplex principle.

Another object of this invention is to provide a telephone exchange installation wherein asynchronous operation of the central control system is provided.

A further object of this invention is to provide an improved telephone exchange installation operating according to the time multiplex principle wherein the processing of information within the central control system of the installation is effected in response to static information, and thus independent from the phase cycle.

Still another object of this invention is to provide an improved telephone exchange system operating according to the time multiplex principle wherein asynchronous operation of the central control system of the installation permits modification of the installation without necessitating changes in the information processing systems of the installation.

Still a further object of this invention is to provide an improved time multiplex exchange installation wherein asynchronous operation of the central control system permits considerably increased processing speeds relatively to synchronously operated systems.

These and other objects of this invention will become apparent as the following description proceeds.

DETAILED DESCRIPTION OF THE INVENTION

Figure 2:
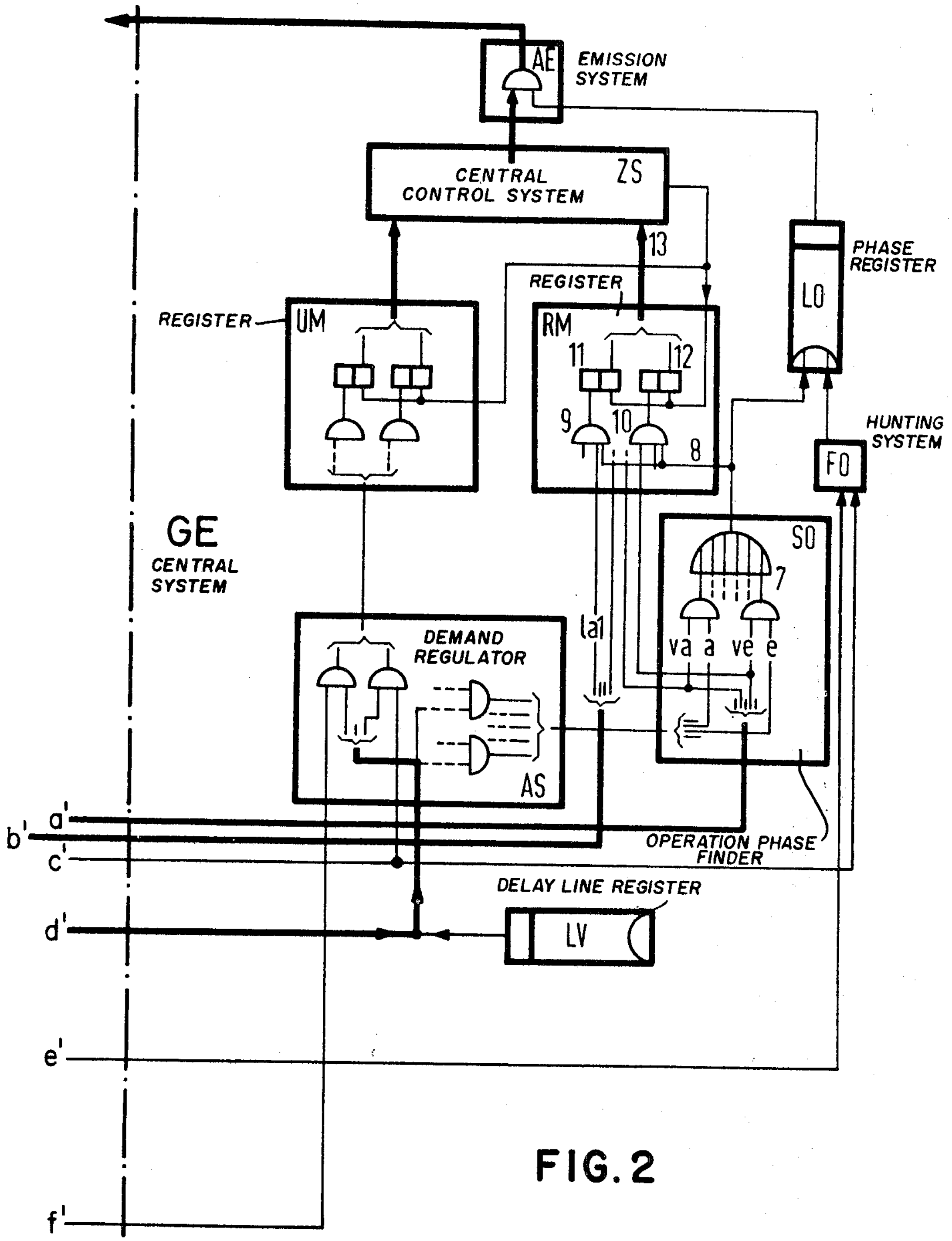

The telephone exchange installation of the invention is set forth in schematic form on two sheets of drawings, identified as FIGS. 1 and 2, for clarity in presentation. To facilitate an understanding of the connections between the portions of the system shown in FIGS. 1 and 2, the lines indicating schematically such connections are labelled by the letters *a* through *f* in FIG. 1 and by the respectively corresponding letters *a'* through *f'* in FIG. 2.

FIG. 1 shows, generally, connection stations associated with the installation and the systems of the installation which are required for establishing connections to these connection stations in accordance with the time multiplex principle. The installation of the invention may comprise a secondary installation or private branch exchange, and may provide for establishing connections to subscriber or speaking stations of the public exchange and exchange locations, to subscriber stations of such secondary installations, and the like. Generally, the term connection station as hereafter employed will be understood to include any such or similar speaking station which may be associated with an exchange installation. In FIG. 2 of the drawings, there is shown schematically the central system GE of the installation, including the component systems which provide for the processing of information identifying the connection stations and the demanded operations, such as completion of call connections, as well as the central control system which provides for the production of command signals for controlling the systems in FIG. 1 to establish required call connections.

The embodiment of the invention set forth in FIGS. 1 and 2 and described in detail hereafter provides for both the reception, and subsequent transmission, of signals of the connection stations, such as identification and demand signals, as well as the establishment of coupling or speaking paths from the stations to a common multiplex communication line according to a time multiplex principle.

Various connection stations which are associated with the installation of the invention are shown in FIG. 1 in block diagram form and identified by the letters TG, S, ZE, VP, AS', N, and AU*e*. The system TG represents an audible signal emitter, for emitting a dial tone or a busy signal, or the like. The system S comprises one of a plurality of speaking energy registers which provides for intermediate registration of speaking energy, e.g., conversation, during the time period between the pulse phases assigned to calling and called subscriber stations. The system ZE comprises a digit receiving system. The system VP represents exchange locations, the system AS' representing one of a plurality of special systems assigned to each exchange location and provided for receiving and emitting special signals such as for switching or indicating lamps or controlling the connection of an exchange location to a calling line or a line to be called. The system N may represent subscriber stations associated with the installation, and the system AU*e* may represent exchange office repeaters. A plurality of each of these systems is provided in the installation, the single block diagram of each being shown for simplifying the drawings.

The installation includes an address generator S1 connected at an outlet line 1 to the subscriber station N. The address generator may further include a register and comparison means to determine changes in the circuit condition of any of a plurality of subscriber circuits as represented by the system N. Address generator S1 scans the subscriber circuits of all subscriber stations N over the line 1. Information signals indicating the condition of the subscriber circuit are transmitted over the signal multiplex line 2 to the generator S1 and are registered in the register (not shown) included herein. A change in condition of a given subscriber circuit is recognized by the comparison means by comparing information signals derived from successive scan cycles, i.e., that of a current scan cycle and the next preceding scan cycle. This comparison may be effected by a system known as a "last-look" register. If desired, the comparison may be effected for a plurality of such successive scan cycles. When a change in the circuit condition of a given subscriber circuit is ascertained, the circuit condition signal, which, due to the cyclic scanning of generator S1 is derived at a given phase during the scanning cycle, is converted into a static demand signal. The static demand signal is applied at the output of address generator 1 through line 3 to the demand regulator AS. The address of the demanding subscriber station N can either be registered in a special register assigned to the address generator S1, or the address generator may terminate its scanning cycle upon receipt of the address of station N upon the recognition of the change in condition of the circuit of the calling subscriber N.

Only one connection station, such as the subscriber station of the system N, can dispose of its demand at a given time. The central system GE, generally shown in FIG. 2 of the drawings and described in detail hereafter, processes the static demand signed and produces command signals for completing the required circuit connections relating to the systems shown in FIG. 1. Only when the processing of the demand signal has been completed by the central control system is the address generator S1 switched forward and continued through its scanning cycle. Alternatively, if the address generator S1 is provided with a special register, then upon completion of the processing of the static demand signal, the address registered in the special register is cancelled. The next demanding calling subscriber station then is ascertained by the address generator S1. In each case, the address of the demanding calling station is produced at the output 4 of the address generator S1.

There is further provided a second address generator S2. The address generator S2, similarly to the generator S1, produces at its output the addresses of the various connection stations associated with it, including those of the exchange office repeater AU*e*, of the calling sets, of the speaking energy registers S, of the exchange locations AS'/VP and of the digit receiving systems ZE. The address generator S2 performs its scanning operation by generating in cyclic succession the addresses of the various connection systems associated therewith and transmitting these addresses over its output at line 5 to these systems. The condition of each scanned system is thereby ascertained. A change in condition of the circuits, resulting from the scanning by the address generator over the line 5, are transmitted from the scanned circuit over the signal multiplex line 6 to signal receiving system KE.

The address generator S2 may also include a register, such as a one-bit register, similar to that provided in the address generator S1. This register provides for comparing the circuit condition of a currently scanned connection station with the circuit condition during the prior scan period to determine if any change in condition occurred. If desired, two such "last-look" registers may be provided whereby the second such register permits a comparison of the circuit conditions between both the first and the second preceding scan cycles, relative to the current scan cycle. If a change in the circuit condition of the system currently being scanned is ascertained, then the address generator S2 may terminate its scan cycle, or, in the alternative, the address of the system for which the change in circuit condition is ascertained can be registered in a register assigned to the signal receiving system KE. If desired, a plurality of special registers may be provided for exclusively registering the condition of a respectively associated one of the plurality of connection stations associated with the address generator S2. Such as the repeaters AU*e*, exchange locations AS'/VP, and digit receivers ZE. With this provision of specially assigned registers, each register need only provide the registration capacity for a single type of address. The provision of such a plurality of specially assigned registers permits, in addition, the transmission of the corresponding addresses to different delay line registers. With the registration of an address, indicating a change in condition of the thereby identified circuit, a demand signal is transmitted over conductor 25 to the demand regulator AS.

In accordance with the described system, a total of four different addresses identifying four different connection stations, i.e., speaking or subscriber stations, repeaters, calling sets, exchange locations, and digit receivers can be registered simultaneously. As a result, a plurality of different demand signals may therefore also be conveyed simultaneously from address generator S2 to demand regulator AS.

Intermediate registers RA and RP are respectively associated with the address generators S1 and S2 and may be provided, optionally, for the intermediate registration of the addresses of the connection stations associated with the generators S1 and S2. The intermediate registration capability of the systems RA and RP is not essential to the registration functions and therefore these systems may be omitted where desired.

Prior to a discussion of the operation of the central system GE shown in FIG. 2, there will briefly be described the operation of the delay line storages LT to LB. The storages LT to LB preferably are of the magnetostrictive type and provide for recirculation of information registered therein in accordance with a cycle having a period equal to that of the phase cycle of the multiplex transmission system. The provision of such delay line registers is well known in the art. With reference to FIG. 1, it will be apparent that various connections are provided from the outputs of the address generators S1 and S2 to associated ones of the delay line registers. In addition, connectors are provided from the outputs of the address generators S1 and S2 and from the outputs of the delay line registers LS to LB to respectively associated comparators VS, VE, VP, VA, and VB.

Each of the delay line registers LT to LB is associated with a given type of connection station of the installation. For example, the delay line register LA is associated with the subscriber stations N. Each of the various connection stations is connectable through a switch, indicated as a circular element containing therein two inclined parallel lines, to a speaking or communication multiplex line labelled SM and indicated as a broad vertical line. The connecting switches are generally referred to as speaking switches and each is controlled by the operation of a decoder associated with the corresponding delay line register. For example, switch SN connects subscriber stations N to the speaking multiplex line or highway SM and is controlled by decoder DA associated with the corresponding delay line register LA. A large number of such subscriber stations, of course, are associated with the installation, each having a speaking switch selectively operable by the decoder DA to complete a connection to the multiplex highway SM.

The registration in a given phase position of the address of a connection station into its corresponding delay line register is effected through the selective actuation of a read-in switch connected to the input of the delay line register. For example, switch SLA is actuated to read in the address of a given calling station at a specified or assigned phase into the delay line register LA. The actuation of one of these switches at a particular phase assigned to the demanding connection station permits the address thereof, as currently generated by one of the address generators S1 and S2 to be read into an appropriate delay line register. Furthermore, there are provided recycling switches 16 and 17 associated with registers LA and LB which may be actuated at the appopriate phase position simultaneously with the respectively associated switches LSA and LSB to permit recycling of the address registered in the corresponding delay line registers LA and LB throughout the duration of the call connection. Typically, one such delay line register is provided for calling subscriber stations, such as the register LA associated with subscriber station N, and a second register, such as LB, associated with exchange repeater AU*e* is provided for called subscriber stations.

The registration of a given address in a given delay line is effected at an assigned phase determined by the central system GE. This registration, it will be appreciated, must be effected during an available or free phase position, i.e., a phase not previously assigned to a different connection station, and consistent with the recognition of a prior registration of a given address in a given delay line register. The aforedescribed comparators make the determination of previous address registration by comparing registered addresses with those currently indicated by the address generators S1 and S2. Such previous address registration may occur as a result of special circuit capabilities which permit a change in the circuit condition at a calling subscriber station during an established call connection.

An address generator ZS' cyclically scans the addresses of speaking registers S and is connected to delay line register LS and the associated comparator VS in accordance with the purposes and functions of the aforedescribed address generators S1 and S2 and their related systems. Similarly, an address generator (not shown) is provided for scanning the addresses of audible signal emitters TG and for applying these addresses to the associated delay line register LT. A special register for identifying free audible signal emitters may be provided and is indicated by the element RS. There are further provided a plurality of hunting systems FS, FE, and FP which determine and identify the free, or available, speaking energy registers S, digit receiving systems ZE, and exchange places and calling sets VP, respectively. The operation of such systems is well known and is not described further herein.

In accordance with the foregoing description, therefore, it will be apparent that each of the connection stations shown in the system of FIG. 1 is connectable through selectively operable switches to the speaking multiplex line SM in accordance with the operation of the corresponding one of the six delay line storages LT to LB through their associated decoders DT to DB. The delay line registers LP to LB further are associated with switches SP to SB, respectively, which must be actuated by the central system GE to enable actuation of the related speaking switches of their corresponding connection stations. This actuation is dependent on an analysis of the circuit conditions, such that through connections are avoided even though a corresponding address is present at the appropriate pulse phase in the delay line storage. This condition may be required, for example, if an address if registered in the storage LP as well as in the storages LA and LB at the identical pulse phase but wherein only two of the three corresponding connection stations are switched or connected to the speaking multiplex line SM. For this circumstance, the completion of a connection through actuation of the switches SP, SA, and SB is not effected by the central system GE. A synchronizing generator T is provided to synchronize the actuation of the switches SP, SA, and SB and, as a result, the controlling function of the corresponding delay line storages LP, LA, and LB.

Referring now to FIG. 2 the demand regulator AS receives the static demand signals from the address generators S1 and S2, and the demand signals from special delay line registers which provide for registration in an assigned phase of signals commanding the supervision of special functions of certain control systems. Only a single register LV of this type is shown. The delay time register LV may comprise a travel time register and operates to transmit static demand signals to the demand regulator AS.

The demand regulator AS includes a plurality of gate circuits which are connected such that upon the simultaneous presence of different demand signals, the first demand signal to be processed will be that signal satisfying certain priority conditions of importance and time preference. That is, selection can be based on the time of receipt of the demand and the type of connection station initiating the demand. The signals of the thus selected demanding connection station then are processed by the central control system ZS, independently of the phase cycle of the system.

The demand regulator AS receives static demand signals for the determination of the succession. For this reason, the demand regulator AS may be assigned to the central, program-control system ZS. The function of the demand regulator AS however does not change in any manner the reception and transmission of signals to be effected in accordance with the time mutliplex operation.

The demand regulator AS has as many inputs as there are demanding systems in the installation. In addition, the demand regulator AS has as many outputs connected to the operation phase finder SO as there are demanding systems present. The identification of the particular demanding system may be effected through suitable codes. As noted previously, the address of a demanding system identified by the address generators such as S1 or S2 is presented to one of the plurality of comparators VS, VE, VP, VA, and VB, the outputs of which are applied to corresponding inputs of the operation phase finder SO, as indicated by the single heavy dark line representing a plurality of such connections.

The operation phase finder SO, by a relatively simple technique, may thereby determine the pulse phase of the information signal. This determination is made in response to the signals received from the comparators in relation to the signals received from the demand regulator AS and which identify the address currently produced by one of the demanding systems such as S1 or S2. The signal arriving from a given comparator, such as VA, is in phase with the assigned phase of the circuit connection relating to the given demanding system so that, as a result, the operation phase finder SO produces an output signal from its gate 7 which is applied to a phase register LO. The phase register LO may comprise a travel time or delay line register and provides for the registration of the phase assigned to the information signals which now are to be processed by the central control system ZS for the time required to effect that processing.

Associated with the phase register LO is a hunting system FO. The system FO determines an available or free phase for a demanding system to which no pulse phase has been assigned. For example, a repeater AU*e* (FIG. 1), when initially seized in a connection, will not have a phase assigned to it. The system FO responds to select an available or free phase which then is assigned to this repeater AU*e*. The system FO emits a signal identifying this free phase which is transmitted to the phase register LO for registration therein during processing by the central control system ZS of the corresponding information signals.

Thus, when the operation phase finder SO cannot ascertain the assignment of a phase corresponding to a given demand, a free or available phase is registered in the phase register LO. This newly assigned phase then is available for further system operations including, for example, the establishment of a call connection and during the existence of the connection. It will be noted that inputs to the system FO are provided from each of the generators S1 and S2 for the purpose of effecting this phase assignment.

The phase register LO provides for the registration of only one phase signal at a given time. As noted previously, the phase register LO may comprise a travel time register. At an appropriate time, therefore, the phase register LO produces an output representative of the registered phase which is applied to a gate of an emission system AE. The processing of information signals by the central control system ZS comprises an asynchronous operation, effected in response to static demand signals. The command signals transmitted to the various systems of the installation, as generally shown in FIG. 1, however, must be maintained with assigned phases in accordance with the multiplex communication system. The emission system AE provides for transforming the command signals produced by the central control system XS into command signals at the appropriate phase in response to the signal received from phase register LO. Thus, phase register LO provides the pulse phase signal to which the system AE responds to effect the phase transformation of the command signals.

Simultaneously with the transmission of phase signals to the phase register LO, and thus simultaneously with determination of the comparison result, comparison signals and other signals indicating exchange conditions at the assigned phase are transmitted to the register RM. These signals are applied, for example, to gates 9 and 10 from the decoders and at the input 8 to these gates from the output of gate 7 of the operation phase finder SO.

As discussed previously comparators VS, VE, VB, VA, and VP in each case ascertain whether the addresses supplied by the generator such ZS′, S2 or S1 are already registered with a pulse phase in a corresponding delay line storage, LS or LE or LP or LA or LB. Thus it is ascertained that, for example, in delay line storage LA the address, which is supplied by generator S1, is already present with phase P1. This phase is ascertained by finder SO for operation phases and supplied to phase register LO. In this manner, all information related to the corresponding address present in delay line storage LA is picked up and processed by the central control system, over demand finder AS and system UM. If an order results from the processing, then this order is conveyed over the system AE, with the corresponding pulse phase which is present in delay line storage LO, to a corresponding switch or register.

The register RM includes a plurality of bistable or flip-flop circuits which are related to the comparison signals and the exchange condition signals and which are set by the signals applied to the register RM, as described above. The flip-flop circuits thereby statically present the appropriate information at the inlet 13 of the central control system ZS. This information thus presented therefore includes both the phase and static information relating to the demanding system, but which information is now presented in a static form.

In parallel with the registration of the exchange conditions and comparison signals, the register UM effects a conversion of the signals relating to the demanding system and present according to phase, in response to the demand regulator AS. The register UM also presents static information to the central control system ZS, as indicated by the heavy dark arrow proceeding from register UM to the system ZS. This information comprises the special control signals which have led to the seizing of the central control system ZS, for example, changes in the connection station circuits, digit receipt identification, consultation signals, shift signals, switch-over signals, and the like.

There are therefore presented to the central control system ZS, in a static form, signals indicative of the exchange conditions, the comparison results, and various other criteria relating to the demanding systems. The central system ZS processes these signals in accordance with a predetermined program which may be provided in a fixed wired system. It therefore is apparent that the processing of the signals performed by the central control system ZS is effected statically in accordance with the asynchronous principle of operation of the invention. The processing results in the production of command signals which are transmitted to the emission system AE for transformation to the command signals at the appropriate phase assigned to the connection station, as hereinbefore described.

The command phase signals produced by the emission system AE are transmitted over a plurality of lines indicated in FIG. 2 by a single heavy line terminating in an arrow. Generally, it is to be recognized that each of the switches shown in FIG. 1 and indicated diagrammatically by a circular element having one or two slanted lines there in and furthermore including a short, radially inwardly directed arrow joined at the periphery thereof, is actuated by a corresponding signal received from the emission system AE over a connection line related thereto and included within the plurality of lines represented by the solid output line of the system AE. Each of the thus indicated switches having but a single internal slanted line operates statically or in a bistable manner, i.e., is switched to either a holding (open) position or an operating (closed) position in response to a control signal and remains in that position until receipt of a subsequent command signal. Conversely, switches having two internal slanted lines are operated dynamically or in a monostable manner from the hold to the operating positions thereof in response to, and only for the duration of, a command phase signal. The registering and cancelling of command phase signals for controlling the switches takes place therefore over the emission system AE of the central control system ZS.

As noted previously, the switches SG, SE, SZ, SV, SN, and SU are actuated in phase dependency in accordance with the address of the related connection stations which are to be connected to the speaking multiplex line SM in response to an output signal transmitted by decoders DT, DS, DE, DP, DA, and DB from the associated delay line registers LT, LS, LE, LP, LA, and LB. The input to the travel time registers, or the receipt therein of an address is effected in phase dependency by phase command signals applied to the dynamic switches ST, SS, SL, SP, SLA, and SLB, as received from the emission system AE.

Thus, for a given call connection, if the circuit condition signals indicate that the connection is to continue, such as for the calling subscriber station N, the speaking switch SN is actuated by a signal from decoder DA received from the corresponding delay line register LA for that pulse phase whereby the station N is connected to the speaking multiplex line SM during that pulse phase. Simultaneously with the read-in of that address, a command phase pulse is produced to actuate the phase switch SLA to re-register the address in the travel time LA for recycling. Similarly, the switches such as SLA are actuated for initial registration of the address upon the initial phase assignment.

The central control system may provide both actuation and release commands for controlling the statically actuated switches. In the alternative, the release commands for the statically actuated switches may be produced in response to outputs of the travel time registers or other delay line storages, and thus independently of the central control system ZS. In this operation, the release signals are produced when the transmission and registration of an address in the appropriate travel time register has been completed.

The dynamic or monostable switches 14 to 17 provide for the phase control transmission of addresses from the travel time registers to their corresponding comparators. The static or bistable switches NS, ASS, PS, ES, ZES, and ARS are also actuated by phase command signals at the appropriate phases to apply the address of demanding systems in parallel to the outputs of the travel time registers to the corresponding comparators. The comparators then ascertain whether the address of a demanding system is present in the corresponding travel time register and, if so, the pulse phase in which it is present. If a given address is present at two or more different pule phases in a delay line storage, then the corresponding comparison system produces an output signal for each such pulse phase, which output is conveyed to the operation phase finder SO.

The special function of the switches SP, SA, and SB has been described previously. The phase control operation of these switches may be effected over auxiliary delay line storages (not shown) in response to phase command signals received from the emission system AE. As noted previously, the switches SP, SA, and SB must be actuated to complete a connection through the corresponding decoders DP, DA, and DB for actuating the respectively associated speaking switches SV, SN, and SU.

Phase control signals are also transmitted from emission system AE to a signal control system KS (FIG. 1) and to its associated input switches AUS and VPS. The switches AUS and VPS provide for applying to the system KS signals identifying a demanding system. The system KS, in response thereto, emits special control signals over the single multiplex line 22 to the demanding systems, such as the exchange places VP and the exchange repeaters AU*e*.

In summary, the demand regulator AS determines the priority or the succession of demands presented to it, in accordance with which priority the demands will be processed by the central control system ZS. Further, the demand regulator AS is conected with the operation phase finder SO, and transmits to it signals relating to the demanding system. Phase finder SO also receives the comparison signals and thereby ascertains the pulse phase of the signals representing a demanding system. The operation phase finder SO therefore controls the transmission of the ascertained phase to the operation travel time register LO for registration therein during the asynchonous processing of the corresponding information signals. Phase finder SO also provides for the transmission of simultaneously ascertained signals of the exchange conditions, including the comparison signals, to the special register RM. The comparison signals and the exchange condition signals thus received by the special register RM are presented statically to the central control system ZS. In addition, the special register UM simultaneously presents statically to the central control system ZS the corresponding address information received thereby from demand regulator AS. The central control system ZS processes these statically presented signals, necessarily in an asynchronous manner, and conveys them to the emission system AE as static commands. The emission system AE responds to these static commands and to the phase register LO to produce phase command signals which are transmitted to the corresponding systems and switches which await the commands.

It will be recognized that the central control system ZS and the emission system AE have as many outputs as there are switches and systems in the installation to be controlled by phase command signals. Further, it is apparent that each system AS, SO, LO, RM, UM, ZS, and AE of the central system GE is operable only when the appropriate information and other signals are applied to the inputs of the system. As a result, the central system is highly effective and efficient in its operation. It is not restricted to operation in synchronism with the predetermined phase cycle of the installation. Nevertheless, the information relating to demanding systems of the installation and registered in accordance with the operation phase cycle, subsequently to the asynchronous processing of the central control system, results in the production of phase command signals at the appropriate phase times required by the multiplex transmission operation of the installation.

It will be evident that many minor changes could be made in the embodiment shown herein as illustrative of the invention. Consequently, the invention is not to be considered limited to the embodiment particularly illustrated, but rather only by the scope of the appended claims.

What is claimed is:

1. A time multiplex communications exchange system including a multiplex highway wherein time-spaced pulse phases assigned to connection stations determine the system processes for the reception and transmission of signals between the connection stations, comprising:

central control system means (ZS) for operating asynchronously independently of said pulse phases to process information statically presented thereto to produce command signals for controlling circuit processes of the exchange system.

a plurality of connection stations (N, AU*e*, VP/AS', ZE, S, TG) selectively connectible to the multiplex highway (SM) of the exchange system in the assigned pulse phase, at least some of said stations being operable to demand connection to others of said stations, demand regulator means (AS) connected to the central control system means (ZS) for receiving such demands for connection and for determining the succession and response priority thereof by the central control system means (ZS), phase finder means (SO) for determining the assigned pulse phase of the signals of each connection station at the time of the demand thereby and operable to effect the static presentation independent of said pulse phases to said central control system (ZS) of all signals of a connection station present in a determined pulse phase, and register means (LO) connected to said phase finder means (SO) for receiving and registering a determined pulse phase during the processing by said central control system means (ZS) of the corresponding signals of the connection station assigned the determined pulse phase.

2. A time multiplex communications exchange system as recited in claim 1 wherein there is further provided:

command emitting means (AE) connected to said central control system means (ZS) and to said register means (LO) for receiving the command signals and the pulse phase therefrom, respectively, for producing phase command signals which effect the control of system processes at the assigned phase.

3. A time multiplex communications exchange system as recited in claim 2 wherein there is further provided:

hunting system means (FO) connected to said register means (LO) for assigning a free pulse phase to a connection station upon the initiation of a connection including that station, said hunting system means (FO) transmitting the newly assigned pulse phase to said register means (LO) whereby the assigned pulse phase is maintained for the duration of the call connection.

4. A time multiplex communications exchange system as recited in claim 1 wherein there is further provided:

address generator means (S1 or S2) connected with a connection station (N or ZE, VP, AU*e*) for determining changes in the condition or signals of a connection station at a specified pulse phase, said address generator means (S1 or S2) being connected with the demand regulator means (AS) for the reception and transmission of the signals of a connection station and for the transmission of the address of the demanding connection station to the demand regulator means (AS).

5. A time multiplex communications exchange system as recited in claim 4 wherein there are further provided:

a plurality of cyclical registers (LS to LB) for registering address of connection stations having assigned pulse phases, said cyclical registers (LS to LB) presenting the registered addresses of connection stations at the assigned pulse phases for successive cycles, said address generator means (S1 or S2) cyclically presenting the addresses of all connection stations (N or ZE, VP/AS', AU*e*) associated therewith, a plurality of comparators (VS to VB) corresponding to said cyclic registers (LS to LB) and connected to corresponding cyclic registers and address generators for comparing the address information respectively presented thereby and producing comparison signals at the pulse phase assigned to the connection station identified by the compared addresses, a special register (RM) for receiving the comparison signals at the assigned pulse phases from the comparators, said special register (RM) being controlled by the phase finder (SO) for changing the comparison signals at assigned pulse phases into static signals for presentation to the central control system means (ZS).

6. A time multiplex communications exchange system as recited in claim 4 wherein there is further provided:

a special register (RA or RP) connected to said address generator means (S1 or S2) over a corresponding switch (NS or PS) for registration and transmission of the address of a demanding connection station to said demand regulator means (AS).

7. A time multiplex communications exchange system as recited in claim 1 wherein there is further provided:

a further special register (UM) connected to said demand regulator means (AS) for receiving and changing demand signals and special signals, emitted according to phase by demanding connection stations, to static signals for presentation to the central control system means (ZS).

References Cited

UNITED STATES PATENTS 3,223,784 12/1965 Inose et al. ---------- 179—15

KATHLEEN H. CLAFFY, Primary Examiner

A. B. KIMBALL, Jr., Assistant Examiner